United States Patent [19]

Hira et al.

[11] Patent Number: 4,906,022
[45] Date of Patent: Mar. 6, 1990

[54] PASSIVE SEAT BELT ARRANGEMENT

[75] Inventors: Kazumi Hira, Fujisawa; Kenro Otsuka, Zama; Takashi Nakamori, Tokyo, all of Japan

[73] Assignee: Nissan Motor Co., Ltd., Yokohama, Japan

[21] Appl. No.: 100,879

[22] Filed: Sep. 25, 1987

[30] Foreign Application Priority Data

Sep. 26, 1986 [JP] Japan ................... 61-226190

[51] Int. Cl.[4] ............................................. B60R 21/10
[52] U.S. Cl. .................................. 280/804; 280/808; 297/469
[58] Field of Search ............... 280/801, 802, 804, 808; 297/469

[56] References Cited

U.S. PATENT DOCUMENTS

| | | | |
|---|---|---|---|
| 4,436,323 | 3/1984 | Yamamoto | 280/804 |
| 4,483,553 | 11/1984 | Nogiwa et al. | 280/804 |
| 4,573,709 | 3/1986 | Kawai et al. | 280/804 |
| 4,607,863 | 8/1986 | Yokote | 280/804 |

FOREIGN PATENT DOCUMENTS 3046326 7/1982 Fed. Rep. of Germany ...... 280/804

Primary Examiner—Kenneth R. Rice
Attorney, Agent, or Firm—Foley & Lardner, Schwartz, Jeffrey, Schwaab, Mack, Blumenthal & Evans

[57] ABSTRACT

Herein disclosed is a passive seat belt arrangement mounted in a vehicle which has a roof side rail and a center pillar which are connected with each other to form a smoothly curved inner edge at a jointed portion therebetween. The arrangement comprises a guide rail attached to the roof side rail and the center piller to extend along the same thereby to form a curved portion thereof at the jointed portion. A carrier carrying one end of a webbing is slidably guided by the guide rail. The carrier has a substantially linear edge portion which faces toward the smoothly curved inner edge portion of the jointed portion when assuming a position of the guide rail on the roof side rail. When the carrier is at the curved portion of the guide rail, an angle defined between the linear edge of the carrier and any tangent line which touches the smoothly curved inner edge is not less than 90 degrees.

11 Claims, 2 Drawing Sheets

PASSIVE SEAT BELT ARRANGEMENT

BACKGROUND OF THE INVENTION

1. Field of the Invention

The present invention relates in general to passive seat belt arrangements for use in a motor vehicle, and more particularly to passive seat belt arrangements of a type wherein one end of the seat belt is connected to a carrier which is slidable along a guide rail attached to a roof side panel and its neighbouring panel of the vehicle.

2. Description of the Prior Art

One of conventional passive seat belt arrangements of the above-mentioned type is disclosed in Japanese Utility Model Second Provisional Publication No. 58-14131, which, as is shown in FIG. 3 of the attached drawings, comprises a belt retractor 3 mounted to an inboard side of a seat 1 for retracting or feeding a webbing 2. A curved guide rail 7 extends along a front pillar 4, a roof side rail 5 and a center pillar 6 of the associated vehicle. The guide rail 7 is obtusely curved at the jointed portion between the front pillar 4 and the roof side rail 5, but largely curved at the jointed portion between the roof side rail 5 and the center pillar 6. The largely curved portion of the guide rail 7 is denoted by numeral 7a in the drawing. A carrier 8 to which one end of the webbing 2 is fixed is slidably guided by the guide rail 7. To a rear end portion of the guide rail 7, there is mounted an anchor device 9 which functions to latch the carrier 8 when the latter is moved thereto to restrain a seat occupant (not shown) with the webbing 2.

The detailed construction of the largely curved portion 7a of the guide rail 7 and that of the carrier 8 are shown in FIG. 4. As is seen from this drawing, the carrier 8 comprises an apertured arm portion 10 to which the end of the webbing 2 is fixed and a base portion 11 which is slidably received in a guide groove (no numeral) of the guide rail 7. The base portion 11 is provided with rollers (no numerals) for smoothing the movement of the carrier 8 along the guide rail 7. The carrier 8 is formed between the arm portion 10 and the base portion 11 thereof with an elongate recess 12. As will be understood from a lower half of the drawing (FIG. 4), when the carrier 8 comes to the anchor device 9, the recess 12 receives therein a stop pin 9a of the anchor device 9, so that the pin 9a can tightly hold the carrier 8 against the force which is applied to the carrier 8 from the webbing 2 in the direction of the arrow F. As is seen from FIG. 3, a flexible wire 14 is connected to the carrier 8, which is driven by an electric motor (not shown) mounted in the vehicle. Known sensors and control devices are connected to the electric motor, so that when a side door 13 assumes its closed position with the seat 1 unoccupied, the carrier 8 assumes its foremost position in the guide rail 7 as shown in FIG. 3, while when the side door 13 is closed with the seat 1 occupied by a passenger, the carrier 8 is moved rearward and downward along the guide rail 7 to the anchor device 9 and latched by the stop pin 9a of the anchor device 9, as is seen from the lower half of FIG. 4. With this operation, the webbing 2 is automatically applied to the passenger when he sits on the seat 1 and closes the door 13.

However, the above-mentioned passive seat belt arrangement has a following drawback due to its inherency in construction. That is, as is seen from an upper half of FIG. 4, when the carrier 8 takes a position other than the vertically extending part of the guide rail 7 (viz., other than the position on the center pillar 6), the arm portion 10 of the carrier 8 is directed backward. That is, when the carrier 8 passes through the largely curved portion 7a of the guide rail 7, the arm portion 10 of the carrier 8 changes its posture, viz., its pointing direction from forward to backward or vice versa. However, this posture change of the carrier 8 brings about a very dangerous matter in that when the carrier 8 is moved backward along the horizontal part of the guide rail 7 toward the largely curved portion 7a of the same, the recess 12 of the carrier 8 is finally closed by a curved inner edge 15 of an upper portion of the center pillar 6 reducing the size of an enclosed space 16 therebetween gradually. The provision of such enclosed space 16 is very dangerous because it tends to injure fingers of a passenger in the vehicle. Although this drawback may be avoided by displacing the guide rail 7 to an upper position indicated by the phantom lines in FIG. 4, a vehicle equipped with a sun-roof can not accept such displacement because the upper portion of the roof side rail of such vehicle is largely occupied by parts of the sun-roof.

SUMMARY OF THE INVENTION

It is therefore an object of the present invention to provide a passive seat belt arrangement which is free of the above-mentioned drawback.

According to the present invention, there is provided a passive seat belt arrangement in which the webbing carrier is so constructed as not to form the dangerous gradually closing space even when the same is moved backward toward the center pillar.

According to the present invention, there is provided, in a motor vehicle having mutually inclined first and second structures which are integrally connected with each other in a manner to form a smoothly curved inner edge at a jointed portion therebetween, a passive seat belt arrangement which comprises a webbing, a guide rail attached to the first and second structures to extend along the same thereby to form a curved portion thereof at the jointed portion of the first and second structures, a carrier carrying one end of the webbing and slidably guided by the guide rail and having a substantially linear edge which faces toward the smoothly curved inner edge of the jointed portion when assuming a position of the guide rail on the first structure, wherein when the carrier is at the curved portion of the guide rail, an angle defined between the linear edge of the carrier and any tangent line which touches the smoothly curved inner edge is not less than 90 degrees.

DETAILED DESCRIPTION OF THE INVENTION

Figure 1:
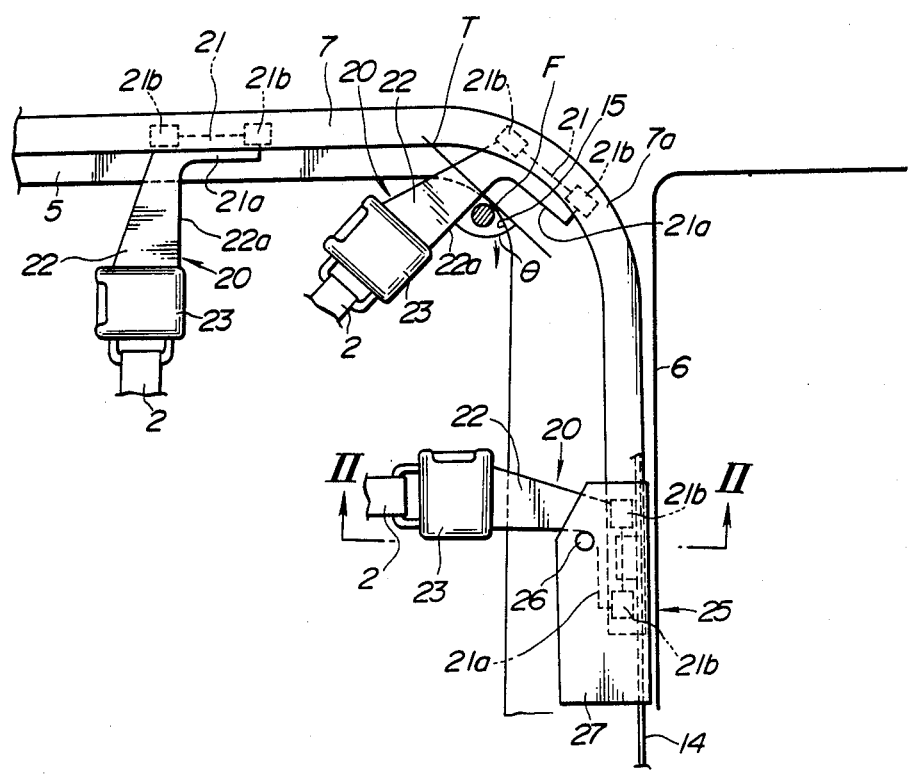
FIG. 1 is an illustration of the essential part of a passive seat belt arrangement according to the present invention.
Figure 2:
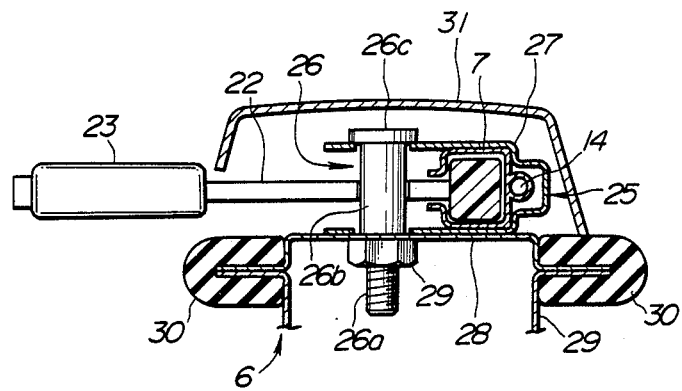
FIG. 2 is an enlarged sectional view taken along the line II—II of FIG. 1.
Figure 3:
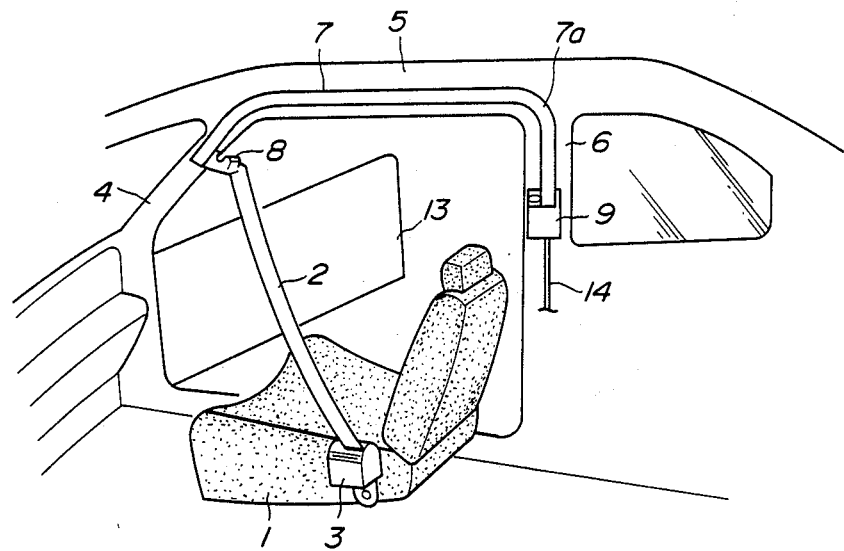
FIG. 3 is a perspective view of a conventional passive seat belt arrangement mounted in a passenger motor vehicle.

Referring to FIGS. 1 and 2, particularly FIG. 1, there is shown an improved passive seat belt arrangement according to the present invention. Similar to the aforementioned conventional one (see FIG. 3), the arrangement of the present invention comprises a belt retactor (not shown) mounted to an inboard side of a seat for retracting or feeding a webbing 2, and a curved guide rail 7 extends along the front pillar, the roof side rail 5 and the center pillar 6 in the same manner as that described hereinafore. The largerly curved portion of the guide rail 7 is denoted by numeral 7a in FIG. 1. Designated by numeral 15 is a smoothly curved inner edge defined by the jointed portion between the roof side rail 5 and the center pillar 6. Slidably guided by the guide rail 7 is a carrier 20 which comprises an arm portion 22 to which the webbing 2 is connected and a base portion 21 which is slidably received in a guide groove of the guide rail 7. As is seen from FIG. 1, the arm portion 22 and the base portion 21 intersect at generally right angles thereby to provide the carrier 20 with a generally L-shaped configuration. It is to be noted that respective inside edges of the arm portion 22 and the base portion 21 are denoted by numerals 22a and 21a, which, in the disclosed embodiment, intersect at generally right angles for the reasons which will be clarified hereinafter. The leading end of the webbing 2 is connected to the arm portion 22 through an emergency buckle 23 which can manually disconnect the webbing 2 from the carrier 20 in an emergency. The base portion 21 of the carrier 20 is provided with plastic sliders 21b for smoothing the movement of the carrier 20 relative to the guide rail 7.

To a rear end of the guide rail 7, there is mounted an anchor device 25 which latches the carrier 20 when the latter is slided thereto to restrain a seat occupant with the webbing 2. As is seen from FIG. 2, the anchor device 25 comprises an anchor base 27 of a generally U-shaped cross section and an anchor pin 26. The anchor base 27 is secured at its one side wall to the center pillar 6, embracing the rear part of the guide rail 7, and the anchor pin 26 is secured to the center pillar 6, passing through aligned openings (no numerals) formed in the side walls of the anchor base 27. The anchor pin 26 shown in the drawing comprises a threaded leg portion 26a, a major portion 26b and an enlarged head portion 26c. The connection of the anchor pin 26 to the center pillar 6 is achieved by engaging the threaded leg portion 26a thereof with a nut 29 welded to an inside surface of the center pillar 6. With the provision of the enlarged head portion 26c of the anchor pin 26, the side walls of the anchor base 27 are prevented from deformably expanding outwardly. As is seen from a lower half of the drawing of FIG. 1, when the carrier 20 comes to the anchor device 25, the bay portion defined between the arm and base portions 22 and 21 is brought into latching engagement with the anchor pin 26. Thus, the anchor device 25 can hold the carrier 20 against a big load applied thereto upon a vehicle collision or the like.

Similar to the afore mentioned conventional arrangement, a driving wire 14 from an electric motor (not shown) is fixed to the base portion 21 of the carrier 20 to move the same. Designated by numeral 30 in FIG. 2 are welts each concealing mated flanges of inner and outer panels 28 and 29 of the center pillar 6, and denoted by numeral 31 is a trim which conceals the guide rail 7.

In accordance with the invention, the following relationship is established. That is, when the carrier 20 is at the largely curved portion 7a of the guide rail 7, an angle "$\theta$" (theta) defined between the inside edge 22a of the arm portion 22 of the carrier 20 and any tangent line T which touches the smoothly curved inner edge 15 of the jointed portion is not less than 90 degrees.

The advantages of the present invention will be described in the following with reference to FIG. 1.

Figure 4:
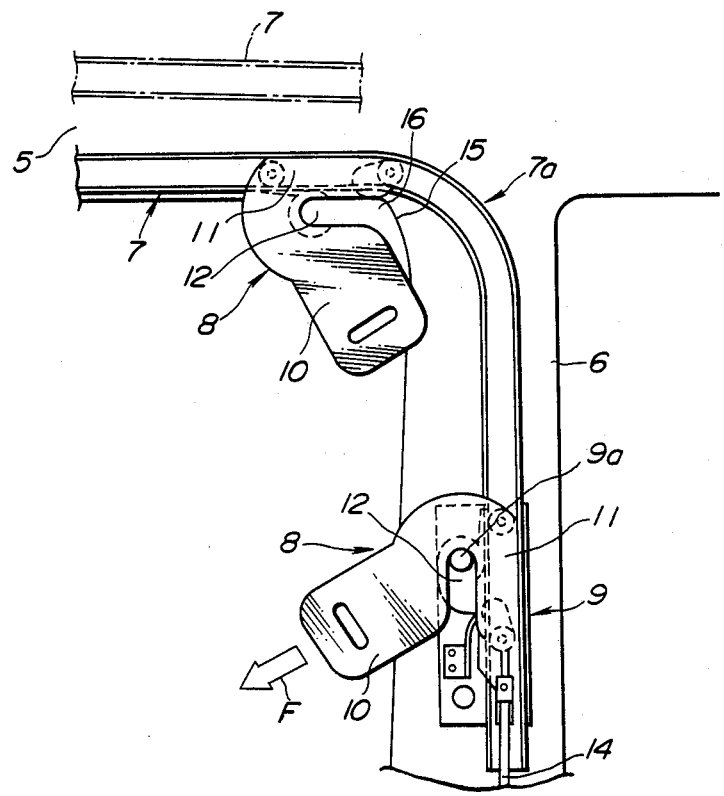
FIG. 4 is an illustration showing the essential part of the conventional arrangement of FIG. 3.

That is, even when the carrier 20 is moved backward along the horizontal part of the guide rail 7 toward the largely curved portion 7a of the same and comes to the portion 7a, the inside edges 22a and 21a of the carrier 20 and the smoothly curved inner edge 15 of the jointed portion between the roof side rail 5 and the center pillar 6 do not form a dangerous enclosed space corresponding to the afore-mentioned gradually closing space 16 (see FIG. 4). Thus, injuries to fingers of the passenger never occur in the invention. This will be understood from FIG. 1 in which one finger of the passenger is indicated by the reference F. That is, even when a finger F of the passengers hand is placed at the indicated position in FIG. 1 during the rearward movement of the carrier 20, the arm portion 22 of the carrier 20 only pushes back the finger F without hurting the same.

We claim:

1. A passive seat belt arrangement for a motor vehicle having a horizontally extending first structure and a vertically extending second structure which are integrally connected with each other in a manner to form a downwardly directed smoothly curved inner edge at a joined portion therebetween, comprising:

a webbing;

a guide rail attached to said first and second structures to extend along the same thereby to form a downwardly directed curved portion thereof at said jointed portion of the first and second structures;

a carrier carrying one end of said webbing slidably guided by said guide rail, said carrier having a linearly extending inside edge which faces toward said smoothly curved inner edge of the jointed portion when said carrier is at a portion of the guide rail by said first structure, wherein when said carrier is at said first structure said linearly extending inside edge extends at generally right angles from the horizontally extending first structure, and when said carrier is at said curved portion of the guide rail, the angle defined between said linearly extending inside edge and a tangential line touching said smoothly curved inner edge is not less than 90 degrees, so that during movement of said carrier on said curved portion of the guide rail from said first structure to said second structure, the inside edges of the carrier and the jointed portion do not form a dangerous enclosed space.

2. A passive seat belt arrangement as claimed in claim 1, in which said carrier comprises:

an arm portion to which said webbing is connected; and a base portion slidably received in a groove of said guide rail, wherein said arm portion and said base portion are connected at substantially right angles.

3. A passive seat belt arrangement as claimed in claim 2, in which a part of said arm portion constitutes said linear edge.

4. A passive seat belt arrangement as claimed in claim 3, in which said arm portion of said carrier is connected to said webbing through an emergency buckle which can manually disconnect the webbing from the carrier.

5. A passive seat belt arrangement as claimed in claim 4, in which said base portion of said carrier is provided with sliders which are slidably received in the groove of said guide rail to smooth the movement of said carrier relative to the guide rail.

6. A passive seat belt arrangement as claimed in claim 2, further comprising an anchor device which is mounted to one terminal end of said guide rail for latching said carrier when the latter comes to said terminal end.

7. A passive seat belt arrangement as claimed in claim 6, in which said anchor device comprises a pin which is secured to said second structure, said pin being engageable with a bay portion defined between said arm portion and said base portion of said carrier.

8. A passive seat belt arrangement as claimed in claim 7, in which said anchor device further comprises an anchor base of a generally U-shaped cross section, said anchor base being secured at its one side wall to said second structure, embracing the terminal end of said guide rail.

9. A passive seat belt arrangement as claimed in claim 8, in which the side walls of said anchor base are formed with aligned openings through which said pin passes.

10. A passive seat belt arrangement as claimed in claim 9, in which said pin is formed with an enlarged head which abuts on an outside surface of one of said side walls of the anchor base.

11. A passive seat belt arrangement as claimed in claim 1, further comprising a driving wire which is driven by a drive motor and has one end fixed to said carrier.

* * * * *